United States Patent Office 3,113,097
Patented Dec. 3, 1963

3,113,097
REACTIVATION OF CATALYSTS
Peter Thomas White and Martin Frederick Olive, Sunbury-on-Thames, England, assignors to The British Petroleum Company Limited, London, England, a joint-stock corporation of Great Britain
No Drawing. Filed Oct. 10, 1960, Ser. No. 61,365
Claims priority, application Great Britain Oct. 13, 1959
7 Claims. (Cl. 208—255)

This invention relates to the reactivation of metallic nickel catalysts used for the selective hydrogenation of gasolines obtained from thermal cracking processes operated at temperatures above 593° C.

Processes for the thermal cracking of petroleum hydrocarbons, for example straight run naphthas, at temperatures above 593° C. are known. The upper limit of temperature is usually 760° C. They are frequently operated in the presence of steam in which case they are conventionally referred to as steam cracking. The principal products are normally-gaseous unsaturated hydrocarbons, but some gasoline is also produced, which is highly unsaturated and tends to form gum, possibly due to the presence of styrene, cyclopentadiene and other conjugated dienes. The gasoline also contains from 0.005 to 0.04% wt. of sulphur, but, because of the high temperature of the cracking this sulphur is thiophene sulphur rather than mercaptan sulphur. Because of this fact it has been recently found that the gasolines can be selectively hydrogenated to remove gum-forming compounds without appreciable hydrogenation of the high octane number monoolefins and/or aromatics with a metallic nickel catalyst, which has been normally regarded as sulphur-sensitive. The process operates at temperatures below 200° C. and long on stream times of six months or more are possible during which the catalyst remains predominantly but not complete metallic nickel. However the catalyst activity gradually declines and is compensated for by alerting one or more of the process conditions, usually by raising the temperature. The precise cause of the deactivation is not known, but a simple method of at least partially restoring the activity would further increase the value of the process.

According to the present invention a method of reactivating a nickel catalyst in which the nickel is predominantly metallic nickel used for the selective hydrogenation of gasolines obtained from thermal cracking processes operated at temperatures above 593° C. comprises passing a stream of hydrogen containing gas over the catalyst at a temperature above 150° C.

The gasolines may boil within the range $C_4$—200° C., and preferably within the range $C_5$—200° C.

The nickel catalyst may be carried on a suitable inert support for example, activated alumina, a group II metal carbonate such as calcium carbonate, sepiolite or any other base which has a low activity for cracking reactions and a low activity for polymerisation reactions. Other examples of such low-activity bases are calcium, barium, strontium, or magnesium oxides, diatomaceous earths, fire brick derived from diatomaceous earth, silicon carbide, quartz, carbon (for example charcoal and graphite), pumice and deactivated alumina. The catalyst may contain from 1.0 to 50% of nickel, expressed as elemental nickel by weight of total catalyst, preferably 5 to 15% wt.

The upper limit of temperature should obviously be below that at which damage to the catalyst or support may occur may conveniently be of the order of 600° C. Temperatures at the lower end of the range are preferred, a particularly convenient temperature range being 200–300° C. The time of the reactivation may be from 1 to 24 hours, shorter times being suitable at the higher temperatures. If reactivation is carried on for any length of time above that strictly necessary for reactivation, there will, however, be no deleterious effect on the catalyst. The hydrogen-containing gas may be pure hydrogen or hydrogen admixed with other gases which are inert to hydrogen and the catalyst and support, for example, nitrogen or lower-boiling normally-gaseous hydrocarbons such as are found in the exit gas from a catalytic reformer. The rate of flow of the hydrogen may be from 20 to 2,000 v./v./hr. (preferably 100–500 v./v./hr.). The pressure may range from 0–1,000 p.s.i.g. preferably 0–350 p.s.i.g.

The metallic nickel catalyst may be prepared initially in any convenient manner, for example by impregnating a suitable support with a solution of a nickel compound, usually a salt, or by intimately mixing a nickel compound with a support. The catalyst is then shaped if necessary into particles of a suitable size and form and the nickel compound is reduced to metallic nickel either directly or through an intermediate stage in which the nickel compound is first converted to nickel oxide.

In the selective hydrogenation process, the gasoline is passed together with a hydrogen-containing gas over a catalyst of metallic nickel, preferably on a support, under conditions such that the gum-forming tendency of the gasoline is reduced. The conditions are also preferably controlled so that hydrogenation of mono-olefins and aromatics does not exceed the minimum necessary to ensure the required improvement in gum forming tendency. Depending on the gasoline being treated the hydrogen consumption may be at least 60 s.c.f./b. more particularly at least 120 s.c.f./b. and it may be more than 150 s.c.f./b. The upper limit of hydrogen consumption will be determined by the undesirability of substantially reducing the octane number of the gasoline by unnecessary hydrogenation of mono-olefins and/or aromatics. In practice a hydrogen consumption of less than 250 s.c.f./b. should be suitable. Preferably the research octane number (with 1.5 ml. TEL/IG) of the gasoline product is not more than one octane number below the research octane number of the similarly leaded feedstock. Leaded research octane numbers are preferred as a basis for comparison since while there may be some slight drop in research octane numbers (clear) as between feed and product, this is offset by an increased lead response in the product. Suitable hydrogenation conditions may be:

Temperature _____ 0 to 200° C. (preferably 80 to 180° C.).
Pressure _____ 0 to 1000 p.s.i.g. (preferably 200–500 p.s.i.g.).
Gas rate (recycle or once through) _____ 300 to 2000 s.c.f. of hydrogen/b.
Space velocity _____ 0.5 to 10 v./v./hr. (preferably about 2 v./v./hr.).

The treated gasoline may be stabilised to give a product of low $C_4$ content and may also be re-run to remove a small proportion, for example, 6% wt. or less, of heavy ends. Re-running at a maximum temperature of not more than 250° C., and preferably not more than 205° C. may be advisable, since high re-running temperatures can adversely effect gum stability.

The reactivation treatment may be conveniently carried out in situ in the reactor without the necessity of removing the catalyst from the reactor. If, however, the catalyst has to be removed, for example to clear a blockage, it has been found that the catalyst can be replaced and reactivated according to the invention. The present invention therefore includes a selective hydrogenation process which includes the steps of passing a gasoline obtained from a thermal cracking process operated at a temperature above 593° C. together with a hydrogen-containing gas over a metallic nickel catalyst, preferably on an inert support, under conditions to reduce the gum forming tendency of the gasoline, discontinuing the process when evidence of catalyst deactivation is apparent, reactivating the catalyst according to the present invention and recommencing the hydrogenation process. Since the hydrogenation process takes place in the presence of hydrogen it may, when removal of catalyst from the reactor is not necessary, merely be necessary to discontinue passage of the feedstock and to continue to pass hydrogen with any alteration of process conditions considered necessary. Evidence of catalyst deactivation is supplied by a drop in hydrogen consumption under the process conditions used and, as stated earlier, is normally compensated for by altering one or more process variables to maintain the hydrogen consumption. Suitable alterations of the process variables include raising the hydrogen partial pressure, increasing the hydrogen/feedstock ratio, decreasing the feedstock flow rate or raising the temperature, the latter being preferred. The present reactivation treatment may be used in combination with such a process where catalyst deactivation is compensated for by alteration of process variables, since the reactivation treatment allows the process to be restarted under less severe conditions, even if the activity is not restored to that of a fresh catalyst.

The invention is illustrated by the following examples:

*Example 1*

A steam cracker gasoline having an average boiling range of 45 to 200° C. was hydrogenated using a catalyst of 9.1 percent weight nickel on alumina under the following process conditions:

Pressure_____ 350 p.s.i.g.
Space velocity_____ 2.0 v./v./hr.
Gas recycle rate_____ 500 s.c.f./b.
Make up gas_____ Platformer exit gas containing 70–80 percent mol hydrogen.

The initial temperature with fresh catalyst was 111° C. which gave a hydrogen consumption of 150 s.c.f./b. and a re-run product having the following inspection data compared with the feedstock.

|  | Feedstock | Re-run Product |
|---|---|---|
| Gum Existent mg./100 ml. | 1 | 1 |
| Gum Accelerated (120 min.) mg./100 ml. | 10 | 3 |
| Induction Period (ASTM) min. | 435 | 560 |
| Total sulphur, percent wt. | 0.009 | 0.009 |
| Octane number, Research, clear | 92.3 | 90.8 |
| Octane number, Research, +1.5 ml. TEL/IG. | 95.9 | 95.8 |

To maintain the hydrogen consumption and hence the quality of the product, the temperature was raised stepwise as follows:

Hours on Stream_____ 70  190  670  2220  2550
Temperature ° C_____ 127  143  152  166   204

After 2595 hours on stream, equivalent to 13.8 bbl. of feedstock processed/lb. of catalyst, the run was discontinued due to deactivation of the catalyst. The catalyst was reactivated by passing a stream of hydrogen through the reactor under the following conditions:

Temperature_____ 250° C. (482° F.).
Pressure_____ Atmospheric.
Hydrogen flow rate_____ 100 v./v./hr.
Time_____ 4 hours.

The process was then restarted under the conditions stated above, when it was found that the same hydrogen consumption and product quality could be achieved at a temperature of 143° C. As the process continued the temperature was again raised stepwise as follows:

| Hours on stream | 397 | 477 | 690 |
|---|---|---|---|
| Temperature, ° C | 160 | 166 | 204 |

The step of catalyst reactivation thus had the effect of increasing the hours on stream by 696, equivalent to an additional 3.6 barrels of feedstock processed per lb. of catalyst.

*Example 2*

A steam cracker gasoline having an average boiling range of 45 to 200° C. was hydrogenated using a catalyst of 9.45% wt. nickel on sepiolite under the following process conditions:

Pressure_____ 350 p.s.i.g.
Space velocity_____ 2 v./v./hr.
Gas recycle rate_____ 500 s.c.f./b.
Make up gas_____ Platformer exit gas containing 70–80% mol of $H_2$.

The initial temperature with fresh catalyst was 118° C. which gave a hydrogen consumption of 150 s.c.f./b. and a rerun product having the following inspection data compared with the feedstock.

|  | Feedstock | Re-run Product |
|---|---|---|
| Gum Existent mg./100 ml. | 1 | 1 |
| Gum accelerated (120 min.) mg./100 ml. | 10 | 5 |
| Induction Period (ASTM), min. | 435 | 720 |
| Total sulphur, percent wt. | 0.009 | 0.008 |
| Octane number, Research, clear | 92.3 | 91.0 |
| Octane number, Research, +1.5 ml. TEL/IG. | 95.9 | 95.9 |

To maintain the hydrogen consumption and hence the quality of the product, the temperature was raised stepwise as follows:

| Hours on stream | 335 | 703 | 924 | 3,250 |
|---|---|---|---|---|
| Temperature, ° C | 127 | 135 | 152 | 154 |

After 4934 hours on stream (equivalent to at least 43 bbl. of feedstock processed/lb. of catalyst), the process was discontinued and after purging of residual feedstock and hydrogen from the reactor, the catalyst was removed to clear a blockage and replaced. The catalyst was then reactivated by passing a stream of hydrogen through the reactor under the following conditions:

Temperature_____ 250° C. (482° F.).
Pressure_____ Atmospheric.
Hydrogen flow rate_____ 100 v./v./hr.
Time_____ 4 hours.

The process was then restarted under the conditions set out above when it was found that the same hydrogen consumption and product quality could be achieved at a temperature of 127° C. As the process continued the temperature was again raised stepwise as follows:

| Hours on stream | 127 | 661 | 700 |
|---|---|---|---|
| Temperature, ° C | 138 | 143 | 149 |

The step of catalyst reactivation had the effect of increasing the hours on stream by at least 1300 hours equivalent to an additional 8.0 barrels of feedstock processed/lb. of catalyst. In addition the example shows that the reactivation treatment effectively counteracts any alteration in the catalyst which may take place when it is exposed to atmosphere during removal and replacement.

*Example 3*

A steam cracker gasoline having an average boiling range of 48 to 200° C. was hydrogenated using a catalyst of 10 percent wt. nickel on sepiolite under the following process conditions:

Pressure _____ 350 p.s.i.g.
Space velocity _____ 2 v./v./hr.
Gas recycle rate _____ 500 s.c.f./b.
Make up gas _____ Platformer gas containing ca. 70% mol hydrogen.

The initial temperature was 114° C. which gave a hydrogen consumption of 140 s.c.f./b. and a re-run product having the following inspection data compared with the feedstock:

|  | Feedstock | Product |
|---|---|---|
| Gum existent mg./100 ml | 8 | 2 |
| Gum accelerated (120 min.) mg./100 ml | 41 | 14 |
| Induction Period (ASTM) min | 310 | 705 |
| Total sulphur, percent weight | 0.039 | 0.023 |
| Octane number, Research, clear | 97.4 | 97.6 |
| Octane number, Research, +1.5 ml. TEL/IG | 99.2 | 99.2 |

To maintain the hydrogen consumption and hence the product quality, the catalyst temperature was raised as follows:

| Hours on stream | 130 | 210 | 327 |
|---|---|---|---|
| Temperature, °C | 121 | 132 | 160 |

After 397 hours on stream the run was stopped and after purging the catalyst of residual feedstock, reactivation was carried out by passing a stream of platformer gas containing ca. 70% hydrogen through the reactor under the following conditions:

Catalyst temperature ____ 204° C. (400° F.).
Pressure _____ 350 p.s.i.g.
Activating gas flowrate __ 175 vol. (gas at STP)/vol. catalyst hr.
Time _____ 4 hours.

The process was then restarted when it was found that the same hydrogen consumption and product quality could be achieved at a temperature of 138° C. compared with 160° C. immediately before the reactivation. As the run continued the temperature was again raised stepwise as follows:

| Hours on stream | 1,410 | 1,500 |
|---|---|---|
| Temperature, °C | 142 | 149 |

Thus the catalyst temperature 1100 hours after reactivation was still lower than the catalyst temperature before reactivation.

We claim:

1. In a process for the hydrogenation of steam cracker gasoline containing gum-forming unsaturated hydrocarbons to reduce the gum-forming tendency of said unsaturated hydrocarbons, the hydrogenation being carried out in the presence of an elemental nickel catalyst on a support at a temperature of between 0 and 200° C. and a pressure of between about 0 and 1000 p.s.i.g., the improvement of reactivating the nickel catalyst when evidence of catalyst deactivation is apparent, which consists of passing a hydrogen-containing gas over the catalyst at a temperature of from 150° C. to 600° C.

2. In a process as claimed in claim 1 wherein the reactivation temperature is from 200 to 300° C.

3. In a process as claimed in claim 1, wherein the time of the reactivation is from 1 to 24 hours.

4. In a process as claimed in claim 1 wherein the rate of flow of hydrogen is from 20 to 2000 v./v./hr.

5. In a process as claimed in claim 1 wherein the reactivation pressure is from 0 to 1000 p.s.i.g.

6. In a process as claimed in claim 1 wherein the catalyst has from 1.0 to 50% wt. of nickel, expressed as elemental nickel.

7. A selective hydrogenation process as claimed in claim 1 wherein the temperature is from 80 to 180° C.

References Cited in the file of this patent
UNITED STATES PATENTS

| 2,298,347 | Corson et al. | Oct. 13, 1942 |
| 2,614,066 | Cornell | Oct. 14, 1952 |
| 2,623,006 | McAfee | Dec. 23, 1952 |
| 2,646,388 | Crawford | July 21, 1953 |
| 3,024,188 | Yeo et al. | Mar. 6, 1962 |

UNITED STATES PATENT OFFICE
CERTIFICATE OF CORRECTION

Patent No. 3,113,097                      December 3, 1963

Peter Thomas White et al.

It is hereby certified that error appears in the above numbered patent requiring correction and that the said Letters Patent should read as corrected below.

Column 1, line 39, for "alerting" read -- altering --.

Signed and sealed this 5th day of May 1964.

(SEAL)
Attest:
ERNEST W. SWIDER

Attesting Officer

EDWARD J. BRENNER
Commissioner of Patents